Jan. 6, 1970 I. DIETRICH ET AL 3,488,617

POWER-CURRENT CRYOTRON

Filed March 23, 1966 3 Sheets-Sheet 1

3,488,617

POWER-CURRENT CRYOTRON

Isolde Dietrich, Munich, Wilhelm Kafka, Tennenlohe, Ludwig Schwank, Nuremberg, and Hans-Günther Kadereit, Munich, Germany, assignors to Siemens Aktiengesellschaft, Erlangen, Germany, a corporation of Germany Filed Mar. 23, 1966, Ser. No. 536,843
Claims priority, application Germany, Mar. 24, 1965, S 96,150
Int. Cl. H01c 7/16; G11b 9/00
U.S. Cl. 338—32 6 Claims

ABSTRACT OF THE DISCLOSURE

Described is a power-current cryotron comprising a cryotron gate conductor, cryogenic means for maintaining said gate conductor at its normal operating temperature, and magnetic field means for controlling the conductance of said gate conductor. The gate conductor is formed of superconductor metal and a multitude of inclusions of insulating or semiconducting material interspersed in said superconductor metal and forming therewith an integral body having in the state of normal conductance at said operating temperature a free electron path length smaller than in said superconductor metal alone. The superconductor metal between the inclusions forms a multitude of current paths having individually a thickness of about $10^{-7}$ to about $10^{-5}$ cm.

Our invention relates to controllable electric resistance or switching devices having a gate conductor of superconductance material switchable by means of a controlled magnetic field between superconducting and normal conducting states. Such devices, called cryotrons, are employed for communication and data-processing purposes, for example as memory devices or other logic components in computers.

Most significant for such and other low-current purposes is the extreme switching speed. This quality is less important when attempting to use cryotrons for the control of power current, such as in the order of amperes or hundreds of amperes, where predominantly other requirements must be met. In the first place, a power-current cryotron would have to possess a high current-carrying capacity in the superconducting state. However, it must also be capable of blocking a high voltage without appreciable losses when in the normal conductance state. This means that the gate conductor of the cryotron, this being the conductor which switches between superconductivity and normal conductivity, must possess a highest possible product of critical current intensity times specific conductance in the state of normal conductivity at the cryogenic operating temperature. To be sure, by multiplying the effective length of the gate conductor, the losses for a given switching power can be reduced. In a known power-current cryotron such multiplication in length is obtained by folding a superconductor tape. This, however, is not satisfactory because it requires a large amount of material and much space. Furthermore, the device neither modifies the critical current density nor the specific resistance at normal conductance.

It is an object of my invention to solve the above-outlined problem in a considerably more advantageous manner by avoiding the necessity for greatly increasing the length and space requirements of the cryotron gate conductor and by also improving the behaviour in the normal conductance state of the gate conductor.

Another more specific object of the invention is to improve high-power cryotrons by increasing the specific resistance of the gate conductor at normal conductivity, thus increasing the value of the product of critical current density times specific resistance.

According to our invention, a power-current cryotron, comprising a gate conductor with cryogenic means for maintaining it at the normal operating temperature and magnetic field means for controlling the conductance to switch from superconductivity to normal, has its gate conductor formed of superconductor metal and a multiplicity of inclusions interspersed in the superconductor metal and forming therewith an integral body of filamentary, laminated or spongy structure, by virtue of which the free electron path length of the gate conductor, when in the state of normal conductance, is smaller than in the superconductor material itself.

By virtue of inclusions, the specific resistance in the state of normal conductance, and consequently the above-mentioned product of critical current density and specific resistance is increased.

To satisfy the requirement that the free mean path of the electrons at normal conductanve be shorter than in the superconducting metal itself, the thickness of the superconductor metal between the inclusions must be correspondingly small, such as in the order of about $10^{-7}$ to $10^{-5}$ cm. A laminated structure of such a gate conductor is obtained by depositing alternating layers of superconductor matreial and insulating material upon a substrate or carrier foil, the superconductor layers having each a thickness withi the just-mentioned range of $10^{-7}$ to $10^{-5}$ cm. Such thin layers of superconductor material may be deposited by vaporization, cathode sputtering, or by chemical methods or precipitation from the vaporous phase. The intermediate layers of insulating material may be vapor-deposited, chemically deposited, produced by anodic oxidation or by thermal oxidation.

A sponge structure which shortens the free path length of the electrons, is obtained, for example, by heating superconductor material to the liquid state, mixing the liquid with pulverized poorly conducting solid substances, such as alumina or other ceramics, and thereafter cooling the mixture. Another way is to mix finely granulated superconductor material and fine granular inclusion material, and thereafter sintering or melting the mixture to obtain a gate conductor. Still another way is to oxidize particles of a powder of superconductance material at the surface or to coat them chemically with insulation, and thereafter sintering, fusing or melting the material.

Further methods reside in reducing the particles of a powder of superconductor oxide at the surface and then sintering or fusing the particles together. A powder of superconductor material may also be sintered to porous constitution, or the superconductor material may first be heated to the liquid state and then substances may be dissolved in the melt which, during subsequent cooling, are segregated in finely distributed form, and then constitute poorly conducting inclusions. Still another way of producing the gate conductor is to prepare a porous body, for instance of ceramic material, having substantially intercommunicating pores and impregnating it in vacuum with a solution of a salt of superconductor material, thereafter evaporating the solvent and subsequently reducing the salt.

The invention will be further elucidated with reference to embodiments illustrated by way of example on the accompanying drawings.

Described presently is an example of a preferred method of producing a power current cryotron with a laminated gate conductor.

A substrate of insulating material, for example ceramic or a foil of insulating material such as polyethyleneterephthalate, is placed into a vacuum chamber in which a layer of superconductor material is deposited upon the substrate by vaporization. This material consists of lead, although niobium, vanadium, tantalum, tin or indium are also applicable, as well as other superconductor materials such as alloys of lead, tin and indium. Thereafter, a thin layer of insulating material is deposited on top of the superconductor layer. This is done by vaporizing or spraying an insulating varnish onto the metal layer. However, the insulating layer may also be produced by first vapor-depositing aluminum or silican and subsequently oxidizing the deposition. A third method of producing the insulating layer is to chemically convert the surface of the superconductor layer to an insulating layer, such as by oxidation. Thereafter, another layer of the superconductor material is deposited. This is followed by the deposition or production of an insulating layer, and so forth, until the resulting number of thin superconductor layers is sufficient for conducting the desired current intensity when in the superconducting state. As explained, the superconductor layers are to have a thickness smaller than the free mean path of the electrons in the state of normal conductance at the cryogenic operating temperature, this layer thickness being approximately within the orders of magnitude of $10^{-7}$ to $10^{-5}$ cm. With a width of 1 cm., a total number of one thousand layers, each having $10^{-6}$ cm. thickness, results in a total superconductor cross section of $10^{-3}$ cm.$^2$, which affords conducting approximately 1000 amps. The ohmic resistance in the state of normal conductance at 4° K. is about 10 to 100 times that of a massive conductor of the same cross section, but the critical magnetic field strength is only moderately increased.

Figure 3:
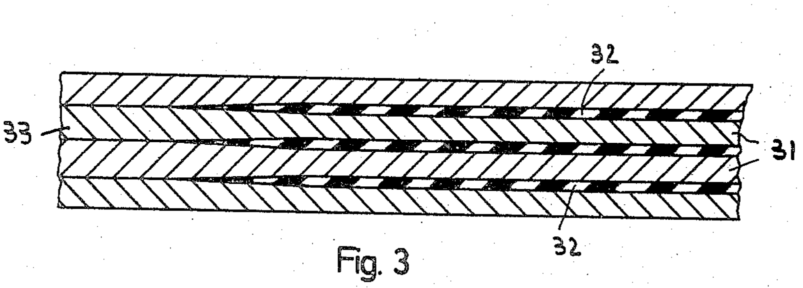
FIGS. 3, 4 and 5 illustrate schematically three types of gate conductors according to the invention, respectively.

FIG. 3 shows schematically and in greatly simplified form a laminated gate conductor in longitudinal section, the superconductor layers, of which only four instead of one thousand are shown, are denoted by 31 and the intermediate insulating layers by 32.

To facilitate contracting the ends of the gate conductor, the insulating layers between the superconductor layers are preferably kept short of the contact localities, this is done with the aid of suitable masking. Thus, in FIG. 3, the superconducting layers 31 in the end portion 33 of the gate conductor are not separated by the shorter insulating layers 32 but are coalesced to form an integral massive end portion of metal. It is advisable to give the individual superconductor layers at these contact localities a greater thickness so that a uniform total thickness of the gate conductor is preserved despite the absence of insulating layers at these localities. If a soft superconducting material is employed, it is preferable to substitute the insulating layers at the ends of the gate conductor by hard superconductor material and to place the end in contact engagement with a terminal structure of hard superconductor material. This distributes the current more uniformly upon the individual layers of the gate conductor. The method of providing such a large number of layers can be automated and thus be performed more economically. The equipment exemplified in FIGS. 1 and 2 affords such a production method.

Figure 1:
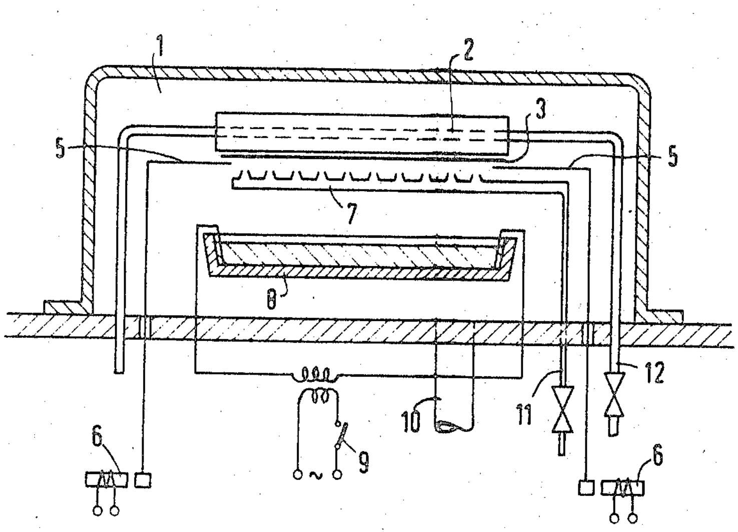
FIG. 1 shows schematically in vertical section an apparatus for producing gate conductors as required by the present invention.

The apparatus shown in FIG. 1 comprises a vacuum vessel 1 in which a cooled carrier 2 is mounted. Attached to the carrier 2 is a substrate 3. The ends of the substrate can be covered by a mask 5 which is movable into the active position with the aid of electromagnets 6. Mounted within the vessel 1 beneath the mask 5 are a spray nozzle device 7 for varnish and a crucible 8 filled with lead, the crucible being located laterally beside the nozzle device 7 in the viewing direction of the observer. The crucible 8 is heated with the air of electric current to be switched on and off by a control switch 9. Tube lines 10, 11 and 12 serve to produce the vacuum and to supply varnish and cooling water.

After inserting the substrate into the vacuum chamber and upon evacuation of the chamber, the vaporization of lead is started by closing the switch 9 and thereafter opening it upon a lapse of a given time. The subsequent spray deposition of varnish, the on-off control of the vacuum pump (not shown) connected to tube 10, the cooling of the carrier 2, and the displacing of the mask 5 by means of the electromagnet 6, are controlled in a regular time sequence by a monitor or program transmitter (not shown). Several cryotrons may thus be produced simultaneously in the vacuum chamber in the course of the same program.

Instead of performing the different treatments in a single chamber, the cryotrons or substrates may be mounted on an endless belt, chain or turret and be sluiced through several chambers in which only individual or a few mutually well compatible treatments are performed. The number of the conveyor circulatory travels through these chambers then corresponds to the number of superconductor layers to be produced.

An automatic method may be performed, for example, by winding a long tape spirally upon a drum, or winding many pieces of tape beside each other upon a drum, and then pass the drum through two or more circularly arranged vacuum chambers separated from each other by vacuum locks or sluices connected to pumps. Lead is vaporized in one of the chambers to precipitate upon the tape. Magnesium is vaporized in a second chamber to precipitate upon the lead coating of the tape. In a third chamber, the tape is heated and the magnesium thereby oxidized in an oxygen atmosphere.

Figure 2:
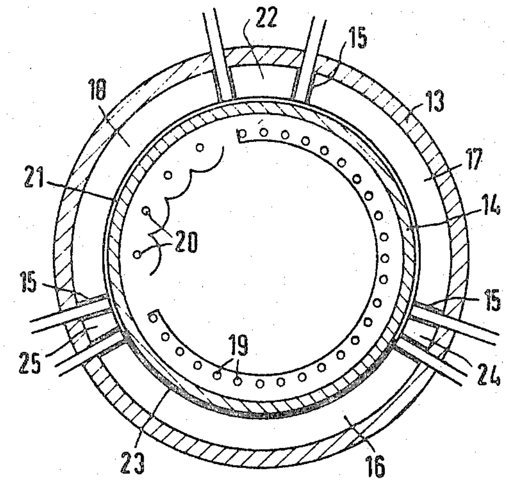
FIG. 2 is a sectional and schematic plan view of another apparatus for producing such gate conductors.

The apparatus shown in FIG. 2 operates in accordance with the last-mentioned manner of processing. Rotatably mounted in a cylindrical housing 13 is a drum 14 whose outer diameter is smaller than the inner diameter of the housing, thus forming an annular interspace which is subdivided by locks 15 into individual segmental chambers. The chamber 16 serves to deposit lead by vaporization and for that reason contains an atmosphere of lead vapor. The chamber 17 serves for vapor deposition of magnesium and the chamber 18 for oxidizing the magnesium. In the region of chambers 16 and 17, the drum 14 is cooled by cooling tubes 19. In the region of the oxidation chamber 18 the drum is heated by a heat radiator 20. Denoted by 21 is the tape which is helically wound upon the drum 14 and upon which lead and magnesium are alternately deposited, the magnesium being subsequently oxidized.

The illustrated apparatus permits the production of gate conductors for power current cryotrons whose length corresponds to approximately one-third of the periphery of drum 14. The subdivision by locks or sluices is so chosen that the chamber for vapor deposition of the superconductor layer extends over about one-third of the drum periphery, and the chambers for producing the insulating layer over slightly less than one-third of the drum periphery. As a result, the superconductor layers are directly deposited upon each other at the ends of the gate conductor so that a good contact can be obtained at these ends.

The illustrated apparatus has a further chamber 22 which affords vapor-depositing a layer of hard superconductor material at the ends of the gate conductor between each two superconductor layers vapor-deposited in the chamber 16. If the drum 14, after each vaporizing operation, is rotated about one-third of its periphery, then, for example after the first step of rotation, the right-hand portion of the gate conductor 23 shown by a heavy line is in the region of the chamber 22, and after the second step of rotation the left portion of the same gate conductor is in the chamber 22. Prior to the effect of the magnesium atmosphere and the oxygen atmosphere, these end portions are protected by the chambers 24 and 25. The locks 15 comprise partitions between which a vacuum is produced so that the atmosphere of one chamber does not penetrate into the adjacent chamber. After the device according to FIG. 2 has performed a number of such operating cycles corresponding to the desired number of superconductor layers, the operation is terminated, and the superconductor tape removed and cut at those localities where no insulation is located. These end localities are thereafter to be contacted by terminal means in the manner already described.

An apparatus according to FIG. 2 may also be operated by maintaining the drum 14 in continuous rotation so that the tape will also run continuously through the series of chambers. As a result, a tape is produced having alternating layers of superconductor and insulation material, which is uniform over the entire length. Such a tape can be folded several times, for example. This mode of operation further permits the production of shorter gate conductors by covering those localities at which the contacts are desired, during the interval of time in which these localities travel through the chambers for the deposition of the insulating layers. This may be effected in accordance with a program in a manner similar to that described with reference to the apparatus of FIG. 1. It will be understood that in each case the programmer may consist of a simple timing switch as employed for many electrical appliances.

Figure 4:
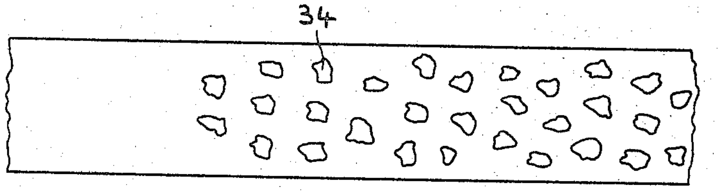
Figure 5:
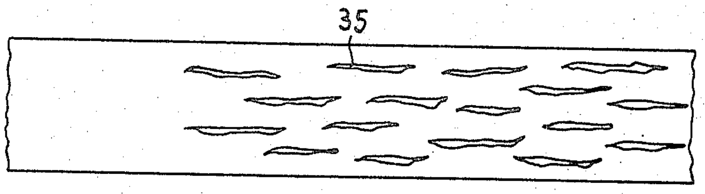

As mentioned above, the requirement relating to the free path of the electrons may also be realized with the aid of superconductors that are not composed of thin laminations, but consist essentially of massive material with a multitude of finely distributed, poorly conducting inclusions consisting, for example, of insulating or semiconducting material. Such gate conductors are schematically exemplified in FIGS. 4 and 5 in which only a few of the inclusions are shown. According to FIG. 4 the inclusions 34 have an irregular pulverulent constitution, whereas, according to FIG. 5 they have the character of elongated fibres 35.

The number of the inclusions is so chosen that the remaining through veins or filamentary paths of superconductor material are at least thick enough to prevent an undesired increase of the critical field strength. On the other hand, these superconductor paths must be thin enough to stay below the above-mentioned free path length of the electrons in the state of normal conductance, thus increasing the ohmic resistance to a multiple. It is favorable if these superconductor paths are not uniformly thick but have constrictions or locally thickened portions. At the thickened localities the critical field strength is very low so that a lower field strength suffices for control purposes, whereas at the thinner localities the path-length effect is well pronounced. When controlling the gate conductor by the magnetic field of the cryostat, the thick localities of the superconducting paths are first converted to normal conductance and the heat thus generated drives the adjacent thin localities likewise to the normal state. Thus, the thin localities reach the normal state at a lower field than when the filamentary paths have everywhere the same slight thickness. The thick localities should preferably correspond to the penetrating depth of the superconductor; that is, for lead these localities should be about $10^{-6}$ to $10^{-5}$ cm. thick, whereas the thin localities for increasing the ohmic resistance should have a thickness of about $10^{-7}$ to $10^{-6}$ cm.

Figure 6:
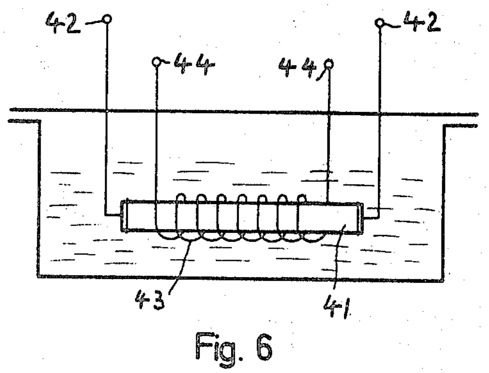
FIG. 6 is a schematic diagram of a magnetically controlled cryotron according to the invention.

The just-mentioned control in a cryotron according to the invention will be understood from the schematic diagram presented in FIG. 6. The gate conductor 41 is shown to have its ends connected to respective load terminals 42. The magnetic field is shown produced by a winding 43 whose terminals 44 are to receive the controlling current. The gate conductor of a cryotron can also be controlled by means of a heat surge which raises its temperature above the critical value for triggering the conductor to its "closed" condition of normal conductance. For the latter type of control, the winding 43 in FIG. 6 is to be designed as a resistance heater.

Figure 7:
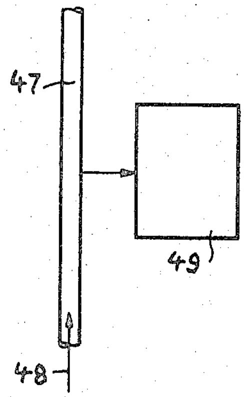
FIG. 7 shows schematically another embodiment of a magnetically controlled cryotron according to the invention.

Also applicable is any other way of cryotron control, such as in an electrical machine where the gate conductor is periodically controlled by the field of a magnet pole rotating relative to the conductor or vice versa. Thus, in FIG. 7 there is shown a tubular gate conductor 47 cooled by cryogenic medium flowing through the tubular conductor as indicated by an arrow 48. The conductor passes by a magnet pole 49 of a machine to be periodically triggered to temporarily "closed" condition. Details of such a machine are described in the copending application of E. Grunwald and W. Kafa, Ser. No. 515,105, filed Dec. 20, 1965, assigned to the assignee of the present invention.

Suitable superconductor materials having a relatively low critical field strength and a high critical temperature are, for example, lead, niobium, vanadium, tantalum, tin and indium, as well as the alloys between lead, tin and indium. Applicable as inclusions are the oxides of the mentioned superconductors, also oxides, carbonates and other compounds of aluminum, magnesium, silicon, iron, and carbon, for example soot, as well as asbestos gas inclusions.

As mentioned, a gate conductor with a sponge structure can be produced by impregnating a porous body with merging pores in vacuum with the solution of a salt of superconductor material, thereafter evaporating the solvent and subsequently reducing the salt. For this method, a porous body of ceramic or other sinter material is applicable. The material must be so chosen that it is not damaged at the low cryongenic temperatures. The intercommunicating pores are impregnated with a solution of lead nitrate or lead acetate, for example. Depending upon the concentration of this solution, the pores retain a larger or a lesser amount of the lead salt. After evaporating the solvent, the impregnated body is subjected to a hydrogen atmosphere in which it is heated to about 200–300° C. whereby the lead salt is reduced. This results in the formation of a coherent lead coating on the pore walls. The thickness of this lead coating is essentially determined by the concentration of the lead salt solution and the pore size.

Upon a study of this disclosure, it will be obvious to those skilled in the art that my invention permits of a great variety of modifications and may be given embodiments other than particularly illustrated and described herein, without departing from the essential features of our invention and within the scope of the claims annexed hereto.

We claim:

1. In a power-current cryotron comprising a cryotron gate conductor, cryogenic means for maintaining said gate conductor at its normal operating temperature, and magnetic field means for controlling the conductance of said gate conductor, said gate conductor being formed of superconductor metal and a multitude of inclusions of insulating or semiconducting material interspersed in said superconductor metal and forming therewith an integral body, said superconductor metal forming between said inclusions a multitude of current paths having individually a thickness of about $10^{-7}$ to about $10^{-5}$ cm. and said integral body having in the state of normal conductance at said operating temperature a free electron path length smaller than in said superconductor metal alone.

2. In a cryotron according to claim 1, said gate conductor having a filamentary texture.

3. In a cryotron according to claim 1, said gate conductor having a laminated texture.

4. In a cryotron according to claim 1, said gate conductor having a spongy texture.

5. In a cryotron according to claim 1, said gate conductor is of the same thickness along its entire length and has end portions substantially free of said inclusions.

6. In a cryotron according to claim 1, said inclusions being formed of pulverulent insulating material embedded in said superconductor metal.

References Cited

UNITED STATES PATENTS

| | | | |
|---|---|---|---|
| 2,707,223 | 4/1955 | Hollmann | 338—32 |
| 3,100,723 | 8/1963 | Weed. | |
| 3,141,979 | 7/1964 | Rinia et al. | 340—173.1 |
| 3,175,198 | 3/1965 | Burns | 340—173.1 |
| 3,267,405 | 8/1966 | Weiss et al. | 338—32 |
| 3,283,168 | 11/1966 | Garwin | 338—325 |

OTHER REFERENCES

IBM Technical Disclosure Bulletin, Ames et al. vol. 5, No. 11, April 1963.

REUBEN EPSTEIN, Primary Examiner

U.S. Cl. X.R.

29—191.2; 117—71; 118—49; 340—173.1